United States Patent [19]

Akiba et al.

[11] Patent Number: 5,598,657

[45] Date of Patent: Feb. 4, 1997

[54] INTER-LINE FISHING ROD

[75] Inventors: Masaru Akiba, Saitama; Shuichi Kimura; Koichi Ito, both of Tokyo; Tomoyoshi Tsurufuji, Saitama, all of Japan

[73] Assignee: Daiwa Seiko, Inc., Tokyo, Japan

[21] Appl. No.: 291,994

[22] Filed: Aug. 18, 1994

[30] Foreign Application Priority Data

Aug. 23, 1993 [JP] Japan .................. 5-050116 U
Oct. 8, 1993 [JP] Japan ..................... 5-277766
Nov. 16, 1993 [JP] Japan ..................... 5-311347

[51] Int. Cl.⁶ ................................................ A01K 87/04
[52] U.S. Cl. .................................................. 43/24; 43/18.1
[58] Field of Search ................................... 43/18.1, 24

[56] References Cited

U.S. PATENT DOCUMENTS

| | | | |
|---|---|---|---|
| 1,595,275 | 8/1926 | White | 43/18.1 |
| 2,282,618 | 5/1942 | Stewart | 43/18.1 |
| 2,324,429 | 7/1943 | Rondelli | 43/18.1 |
| 2,776,516 | 1/1957 | Jennette | 43/24 |
| 2,777,239 | 1/1957 | Cushman | 43/18.1 |
| 3,862,509 | 1/1975 | Petersen | 43/17.5 |
| 4,183,163 | 1/1980 | Reiner | 43/24 |
| 4,212,126 | 7/1980 | Barnett | 43/24 |
| 5,159,776 | 11/1992 | Horton | 43/24 |
| 5,299,377 | 4/1994 | Akiba et al. | |

FOREIGN PATENT DOCUMENTS

| | | |
|---|---|---|
| 1360248 | 8/1964 | France . |
| 2539582 | 7/1984 | France . |
| 62-24461 | 6/1987 | Japan . |
| 1-178373 | 12/1989 | Japan . |
| 1259820 | 1/1972 | United Kingdom . |
| 1526582 | 9/1978 | United Kingdom . |
| 1526581 | 9/1978 | United Kingdom . |
| 2213691 | 8/1989 | United Kingdom . |

*Primary Examiner*—Kurt Rowan
*Attorney, Agent, or Firm*—Longacre & White

[57] ABSTRACT

The invention relates to a line introduction portion for an inter-line fishing rod. A line introducing hole is located within a range between a point distanced forward about ⅓ of the entire rod length L from the bottom end of the rod tube and another point distanced rearward about ⅓ of the entire rod length from the tip top. When a plurality of interline fishing rod is manufactured as series, the locations where the line introducing holes of the fishing rods of the soft type, the forward-bent type, the long type, and the small standard weight type are formed are respectively set closer to the butts of the fishing rods than those of the line introducing holes of the fishing rods of the hard bending type, the forward-bent type, the short type, and the large standard weight type. Series of inter-line fishing rods with easy handling and increased casting distance can be provided.

9 Claims, 4 Drawing Sheets

INTER-LINE FISHING ROD

BACKGROUND OF THE INVENTION

The present invention relates to an inter-line fishing rod in which a fishline is introduced into the inside of the fishing rod, passed therethrough and drawn out therefrom at the tip thereof.

Published Unexamined Japanese Utility Model Application No. Sho. 62-24461 discloses an inter-line fishing rod constructed such that a line passing hole is provided in the hinder part of the tip portion. In contrast, Published Unexamined Japanese Utility Model Application No. Hei. 1-178373 discloses an inter-line fishing rod constructed such that a line insertion hole is formed in the fore part of the butt rod.

To use such inter-line fishing rods for a casting rod, some problems to be solved are present in the structures thereof.

In casting a fishing line by the inter-line fishing rod, a pliability or flexibility over the entire length of the inter-line fishing rod from the butt rod to the tip rod is fully utilized. In the structure of the fishing rod of the publication '461, a fishing line is introduced into the rod tube at a location closer to the tip top, so that if the number of fishing line rings outside the rod is small and the inter-line fishing rod is bent along its entire length, then the fishing line outside the rod tube is apart from the rod to take the shape like a string of a bow. The fishing line so shaped cannot follow the bending of the fishing rod. Consequently, the fishing line, when cast, can insufficiently make use of the pliability of the entire fishing rod, so that the distance the fishing line is cast is unsatisfactory. Additionally, the casting direction of the fishing line is not coincident with the direction of the recoiling of the fishing rod in consequence of a great bending thereof. As a result, a bait or lure attached to the cast fishing line lands on a point off the target point.

Since the fishing line is apart from the rod to take the shape like a string of a bow, an angle of the fishing line when introduced into the rod tube is greatly varied. The result is increase of the fishing line resistance.

In addition, the fishing line is greatly bent at points before and after it is introduced into the rod tube. The fishing line resistance is greatly increased there.

In the publication '373, a fishing line is introduced into the fishing rod at a location in the hinder part thereof. Because of this structure, resistance of the fishing line within the rod tube is increased, and an insufficient casting distance is secured.

SUMMARY OF THE INVENTION

Accordingly, an object of the present invention is to provide an inter-line fishing rods in which the fishline introducing section is provided at an appropriate location in order to reduce the undesired friction of the fishline as greatly as possible.

Another object of the present invention is to provide an inter-line fishing rod which allows a fishing line to be cast exactly to a target point and increases a casting distance.

A further object of the present invention is to provide a series of inter-line fishing rods which have different positions of the line introducing holes, which are selected depending on the characteristic of the fishing rod, i.e. the soft or hard bending type, the forward-bent type or rearward-bent type, the long or short rod length, or the large or small preferable-catch-weight of the fishing rods, whereby easy handling of the fishing rods is realized and the casting distance is increased.

A still further object of the present invention is to provide an inter-line fishing rod in which a fishing line is prevented from being cut in handling the fishing rod.

To achieve the above-noted and other object, the present invention provides an inter-line fishing rod in which a line introducing hole is located within a range between a point distanced forward about ⅓ of the entire rod length L from the bottom end of the rod tube and another point distanced rearward about ⅓ of the entire rod length L from the tip top.

The location of the line introducing hole is selected within the above-noted range depending on the characteristic of the fishing rod. That is to say, in a series of the fishing rods, the locations where the line introducing holes of the fishing rods of the soft bending type, the rearward-bent type, the long type, and the small preferable-catch-weight type are formed are respectively closer to the butts of the fishing rods than those of the line introducing holes of the fishing rods of the hard bending type, the rearward-bent type, the short type, and the large standard preferable-catch-weight type.

To increase the casting distance of a fishing rod, it is necessary to reduce the fishing line resistance. In the inter-line fishing rod, if the fishing line is introduced into the rod tube from the butt of the fishing rod, the inner surface of the rod tube, where is in contact with the introduced fishing line, is large. Accordingly, the sliding friction of the line to the inner surface is increased. For this reason, the way to introduce the fishing line into the rod tube at a location in the tip part of the fishing rod can more reduce the sliding friction. However, if the line introducing location is too closer to the tip top, the fishing line is apart from the bent rod to take the shape like a string of a bow, as described above. As a result, the line introducing angle greatly varies, the fishing line resistance increases. It is impossible to well utilize the bending of the entire fishing rod. Accordingly, the handling of the fishing rod is poor. A long casting distance cannot be secured.

Thus, to increase the casing distance, it is very important to reduce the variation of the introduction angle of the fishing line as well as to reduce the sliding resistance. The fishing rod has various characteristics, such as soft and hard bending, forward- and rearward-bent, long and short rod length, large and small preferable catch weight. It is a common practice that the fishing rods are manufactured in a state that those rods are classified every rod characteristic into series. In the fishing rods, an angle of introducing the fishing line into the rod tube varies depending on the location for forming the line introducing hole, which also depends on the characteristics of the fishing rod.

In the range of the fishing rod except the part thereof ranging up to the point distanced about L/3 from the butt of the rod and the point distanced about L/3 from the tip top thereof, the length of the rod acting as a moment of the fishing rods of the soft bending type, the rearward-bent type, and the long type, is longer than that of the fishing rods of the hard bending type, the rearward-bent type, the short type, and the large standard preferable-catch-weight type. In other words, the bending moment is larger. Since the fishing rod of a small preferable catch weight has the nature of the soft bending type, it is easily pliable. Therefore, if the line introducing hole is formed at a location closer to the butt within that range of the fishing rod, it can be prevented that the fishing line is apart from the bent rod to take the shape like a string of a bow. As a result, the handling of the fishing rod is improved, and a long casting distance is secured.

The present invention further provides an inter-line fishing rod characterized in that a line guide for guiding a fishing line from the outside of a rod tube to the inside thereof is located at a point near to a point where the fishing line comes in contact with an arc of the fishing rod when it is whipped for casting, within a range between a point distanced forward about ½ of the entire rod length from the bottom end of the rod tube and another point distanced rearward ⅓ of the entire rod length from the tip top of the rod tube, and a line guide ring for changing the direction of the fishing line is disposed such that an angle of the fishing line when it is introduced into the rod tube through the line guide is 15° or smaller.

The line guide is located at a point distanced the ½ to ⅓ rod length from the tip top of the fishing rod and near a point where the fishing line pulled out from the reel located at the rear part of the fishing rod comes in contact with an arc of the rod whipped for casting. This point where the line guide is located is the point at which a great bending of the fishing rod starts when it is whipped for casting.

In the inter-line fishing rod thus constructed, in a region of the fishing rod where the fishing rod is greatly bent for casting, a fishing line runs within the rod tube. Accordingly, the fishing line follows the bending of the rod. Accordingly, the casting direction of the fishing line is coincident with the direction of the recoiling of the fishing rod in consequence of a great bending thereof. In another region where the fishing rod is little bent, the fishing line runs outside the rod tube, so that the fishing line resistance is more remarkably reduced when comparing with the fishing rod of the type in which the fishing line runs in the rod tube.

Further, in the inter-line fishing rod of the invention, the fishing line runs at an angle of about 15° with respect to the middle rod, within the line guide. The line guide is located near to a point where the fishing line pulled out of the reel comes in contact with an arc of the fishing rod when it is whipped for casting. Therefore, when cast, the fishing line runs within the rod tube in a state that it does not undergoes a great bending (change of its direction). Accordingly, the fishing line resistance is satisfactorily reduced.

The present invention further provides an inter-line fishing rod in which a fishing line is introduced from the outside of a rod tube into the inside thereof at a location thereof closer to the tip top of the fishing rod than a location where a reel is mounted, wherein a first guide ring made of wear-proof material is provided within the rod tube, and second and third guide rings and of made of wear-proof material are arranged in this order on the rear side of the first guide ring outside the rod tube, a line connecting the center of the first guide ring to the spool center of the reel passes through the second and third guide rings, only the fishing line lies in a phantom tube connecting the inner circumferences of the first and second guide rings and a phantom tube connecting the inner circumferences of the second and third guide rings, and the inner diameters of the first, second, and third guide rings become larger in this order.

In the inter-line fishing rod thus constructed, a line connecting the center of the first guide ring to the spool center of the reel passes through the second and third guide rings. When the fishing line is tensed, it does not contact with the second and third guide rings. Accordingly, the fishing line can be wound up at a small fishing line resistance. The size of the three guide rings are selected such that the guide ring located closest to the reel is large, the guide ring next close to the reel is medium, and the guide ring farthest from the reel is small. When the fishing rod, if provided with a spinning reel, is whipped for casting, the spiral tuning/vibrating motion of the fishing line is gradually attenuated by the guide rings. The fishing rod reshaped to be substantially linear is introduced into the rod tube. Within the rod tube, the fishing line runs in a state that it hardly comes in contact with the inner surface of the rod tube. Therefore, the fishing line resistance is reduced and the casting distance is elongated. Additionally, the fishing line is prevented from being cut.

DETAILED DESCRIPTION OF THE PREFERRED EMBODIMENTS

The preferred embodiment of the present invention will be described with reference to the accompanying drawings.

The fishing rod is classified into a hard fishing rod of the forward-bent type and a soft fishing rod of the rearward-bent type. When the hard fishing rod of the forward-bent type is whipped for casting, the fishing rod is greatly bent at a point distanced about the ⅓ rod length from the tip top thereof. The soft fishing rod of the rearward-bent type, when whipped, is greatly bent at a point distanced about the ½ to ⅓ rod length from the butt. A fishing rod of the medium type, when whipped, is greatly bent at a point within the range between a point distanced the ⅓ rod length from the butt and another point distanced the ⅓ rod length from the tip top, generally between a point distanced from the ½ rod length from the butt and another point distanced the ⅓ rod length from the tip top.

Figure 1:
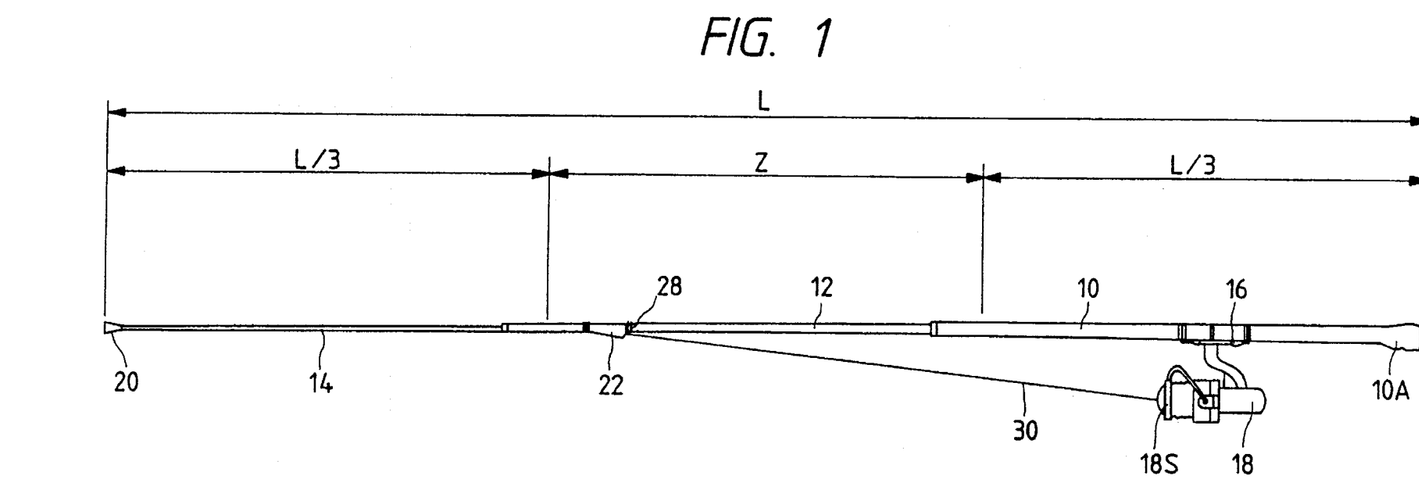
FIG. 1 is a side view showing an inter-line fishing rod according to an embodiment of the present invention.
Figure 2:
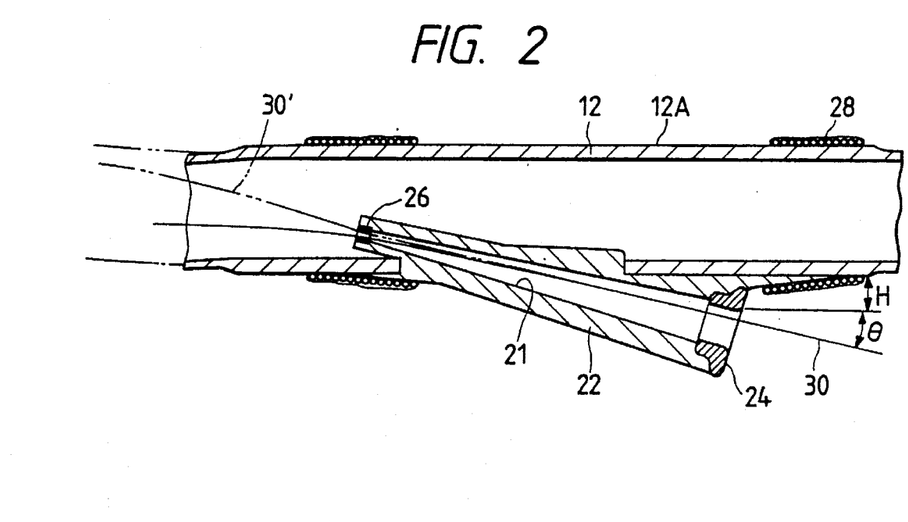
FIG. 2 is an enlarged longitudinal sectional view of a line introducing hole and its near part shown in FIG. 1.

FIG. 1 is a side view showing an inter-line fishing rod according to an embodiment of the present invention. FIG. 2 is an enlarged longitudinal sectional view of a part of the inter-line fishing rod. A fishing rod is made of reinforced fiber containing thermoset or thermoplastic as a matrix. The fishing rod of this embodiment is formed by jointing together a butt rod 10, a middle rod 12, and a tip rod 14 in a normal joint fashion. The number of joints may be appropriately selected. As a matter of course, the fishing rod may consist of a single integral rod. A top guide 20 is attached to the tip top of the tip rod 14. A reel sheet 16 is fastened to the butt rod 10, and a spinning reel 18 is attached to the reel sheet 16. A hand grip 10A is formed in the bottom or base part of the rod tube.

A line guide 22 is fastened to the fore part of the middle rod 12 by means of coiled wires 28. The entire length of the casting rod is denoted as L. The line guide 22 (more specifically, a line introducing hole 21 of the line guide 22) is located within a range Z between a point distanced forward about ⅓ of the entire rod length (a point distanced approximately (⅓)L from the rear or bottom end of the rod tube) and another point distanced rearward ⅓ of the entire rod length from the tip top thereof (another point distanced approximately (⅓)L from the top end of the rod tube). Within the range Z, the line guide 22 with the line introducing hole 21 is located preferably at a point near to a point where a fishing line 30 pulled out of the spinning reel 18 comes in contact with an arc of the fishing rod when it is whipped for casting. That is to say, the line guide 22 is located such that the fishline 30 extends from the fishing reel 18 to the line introducing hole 21 in a tangential direction with respect to the fishing rod bent into the arcuate shape when it is whipped.

The fishing line 30 is inserted into the middle rod 12 and the tip rod 14, viz., the part of the fishing rod forwardly more distant than the line introducing hole 21, (the fishing rod is greatly bent in this part when the fishing rod is whipped for casting). Accordingly, the fishing line can follow up the bending motion of the fishing rod when the rod is whipped for casting. The casting direction of the fishing line is coincident with the direction of the recoiling of the fishing rod as the result of the great bending thereof. In the part of the fishing rod located on the rear side of the line introducing hole 21 (this part is not bent), the fishing line 30 lies outside the rod tube. The fishing line resistance is remarkably reduced when comparing with the fishing rod of the type in which the fishing line is inserted into this part of the rod tube.

As already stated, there are various types of fishing rods, such as soft and hard types, forward-bent and rearward-bent types, long and short types, and large and small standard preferable-catch-weight types of the fishing rods. (Note that the large standard preferable-catch-weight type rod means a fishing rod designed to be equipped with a relatively large weight fish hooking device including a hook, weight and so on, whereas the small standard preferable-catch-weight type rod means a fishing rod designated to be equipped with a relatively small weight fishing hooking device.) Rod bending states are defined by the characteristics of the fishing rods of those types. Proper selection of the location of the line introducing hole 21 of the line guide 22 leads to reduction of the line resistance, and has a great influence on the handling performances of the fishing rod for casting.

To reduce an angle of the fishing line 30 when it is introduced into the rod tube, the locations where the line introducing holes 21 of the fishing rods of the soft type, the rearward-bent type, the long type, and the small standard weight type are formed are within that range, and respectively closer to the butts of the fishing rods than those of the line introducing holes 21 of the fishing rods of the hard type, the rearward-bent type, the short type, and the large standard weight type. If so designed, the line resistance is reduced, the casting distance is elongated, and the casting handling of the fishing rod is improved. Further, in case where fishing rods having respective different characteristics are manufactured according to the just-mentioned rules as a series, a fisherman does not feel a sense of umcompatibility when he replacingly uses one from another thereamong.

In the embodiment thus far mentioned, the line guide 22 (line introducing hole 21) is formed at a location in the part of the rod except the parts thereof ranging up to the points distanced about L/3 respectively from the butt and the tip top of the rod. A further reduction of the fishing line resistance, an easy adjustment of the bending, and a further elongation of the casting distance are realized if it is formed at a location in the range of the rod except the parts thereof ranging up to the points distanced about L/2 from the butt of the rod and about L/3 from the tip top thereof.

As shown in FIG. 2, the line guide 22 is fastened to a thick, rod reinforcing part 12A. Line guide rings 24 and 26, made of ceramics, are firmly attached to both ends of the line introducing hole 21 of the line guide 22. Whether or not the fishing line 30 is brought into contact with the line guide ring 24 located at the rear end of the line introducing hole 21 depends on the height H of the line guide ring 24 as measured from the surface of the rod tube and the inclination angle θ of the fishing line 30. It is desirable that the fishing line 30 is not brought into contact with the line guide ring 24 as in the case of the fishing rod illustrated where the height H and the inclination angle θ are properly selected. The fishing line 30 is brought into contact with the inner surface of the line guide ring 26, which is located at the fore end of the line introducing hole 21. At this contact position, the fishing line 30 is changed in its direction while being pulled toward the tip top of the fishing rod. Reduction of the angle of the fishing line when it is changed in its direction greatly contributes to reduction of the fishing line resistance. For this reason, it is very important to reduce the angle θ and to introduce the fishing line into the line introducing hole 21 in a linear shape.

If the height H of the line guide ring 24 is small, the fishing line 30 comes in contact with the surface of the middle rod 12, for example, thereby further increasing the fishing line resistance. To avoid this, a certain measure of the height H is required. In this embodiment, an inclination angle of the center line (not shown) of the line introducing hole 21 is approximately 13°. An angle of the fishing line 30 when it is introduced into the rod tube by way of the line guide 22 is approximately 10°.

As shown, when a normal state of the inter-line fishing rod where the line guide 22 is inclined at approximately 13° and the fishing line 30 is introduced at approximately 10° is shifted to a bending state of the fishing rod when it is whipped for casting (indicated by two-dot chain lines in FIG. 2), the fishing line 30 is smoothly introduced into the rod tube through the line guide 22, with a little change of its direction with respect to the greatly bent rod tube, as indicated by a phantom line 30'. In the casting mode, from this state, the fishing line recovers from its bent state and takes a linear shape as indicated by a solid line. Since the preferable position of the line introducing hole 21, as described above, is located at a position near to the tangential point of the fishing line which touches the curve depicted by the bent fishing rod, there is no chance that the fishing line is greatly turned from the middle rod 12 during the transient period of reshaping the bent rod into the linear rod. Therefore, the fishing line resistance is sufficiently reduced and a casting distance is increased.

The fishing line wound on a spool 18S of the spinning reel 18, when cast, is pulled forward therefrom while being spirally turned. If the fishing line is introduced into the rod tube while being spirally turned, it runs within the rod tube while fictionally contacting with the inner surface of the rod tube. Therefore, the fishing line resistance becomes large.

To reduce this fishing line resistance, the present invention reduces the spiral turning motion of the fishing line in two stages. In the first stage, to reduce the spiral turning motion, the inner diameter of the line guide ring 24 is reduced properly. In the second stage, the inner diameter of the line guide ring 26 is ½ or smaller than that of the line guide ring 24, thereby substantially removing the spiral turning motion of the fishing line 30. The fishing line thus processed for the spiral turn removal is then introduced into the middle rod 12. In this embodiment, the inner diameters of the line guide ring 24, and the line guide ring 26 are selected at approximately 3:1.

The fishing line leaving the spool 18S has a great spirally-turning motion. In an attempt to gain a linear fishing line by rapidly reducing such a large spiral turn of the fishing line at only one point, the fishing line greatly changes in its direction at that point, so that the fishing line resistance is increased, and the running speed of the fishing line is reduced. To avoid this problem, in this embodiment, two separate stages for removing the spiral tuning motion of the fishing line are arrayed along the path of the fishing line. The inner diameters of those rings should be gradually reduced at the ratio of at least 2:1.

Figure 3:
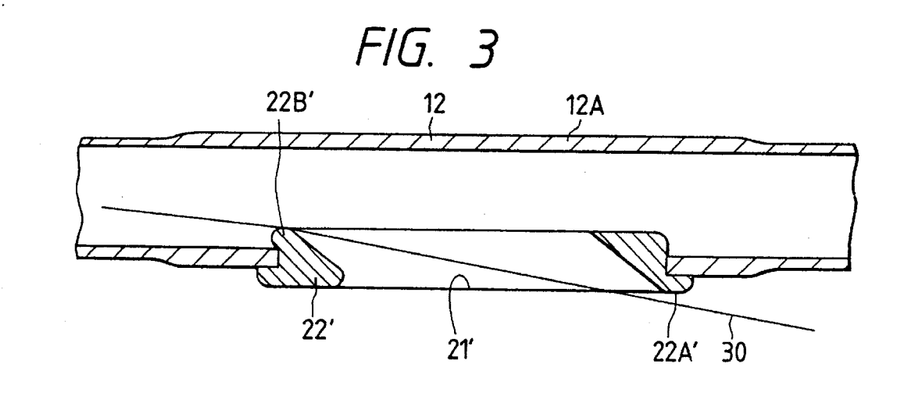
FIG. 3 is an enlarged longitudinal sectional view showing another embodiment of the line introducing hole and its near part shown in FIG. 2.

In another embodiment of FIG. 3, a line guide 22', made of ceramics, which has a hole 21' elongated in the longitudinal direction of the rod tube, in place of the line guide 22 of the FIG. 1 embodiment, is firmly attached to the rod reenforcing part 12A of the middle rod 12. The fishing line 30 does not contact with the rear end face 22A' of the line guide 22', which is located inside the rod tube, but contacts with the fore end face 22B' thereof located outside the rod tube. The fishing line 30 is slightly changed at the fore end face 22B' and extended forward. Thus, not only the line guide 22 shown in FIG. 2 but also the line guide 22' with the elongated hole 21' as shown in FIG. 3 can reduce the introducing angle of the fishing line 30.

The fishing rod shown in FIG. 1 is of the normal joint type, but may be of the telescopic type. The fishing line guide as shown in FIG. 3 is well adaptable for the fishing rod of the telescopic type.

As seen from the foregoing description, the inter-line fishing rod of the present invention is constructed such that in a region where the fishing rod is greatly bent for casting, a fishing line runs within the rod tube so as to follow the bending of the rod, while in another region where the fishing rod is little bent, the fishing line runs outside the rod tube so as to reduce resistance of the fishing line. With this unique construction, the casting performance of the fishing line is good, and the casting distance is increased.

Series of fishing rods are designed so as to have different positions of the line introducing holes, which are selected depending on the soft or hard type, the forward-bent type or rearward-bent type, the long or short rod length, or the large or small standard weight of the fishing rods. Therefore, in handling different fishing rods of a series of fishing rods, a fisherman does not feel a sense of umcompatibility. Easy handling of the fishing rods is realized and the casting distance is increased. Here, when a plural number of fishing rods are manufactured, as series, with different characters, if the fishing rods are sold separately, not a set of fishing rods, the fishing rods are considered as those of series.

Yet another embodiment of the present invention will now be described with reference to FIGS. 4 and 5.

Figure 4:
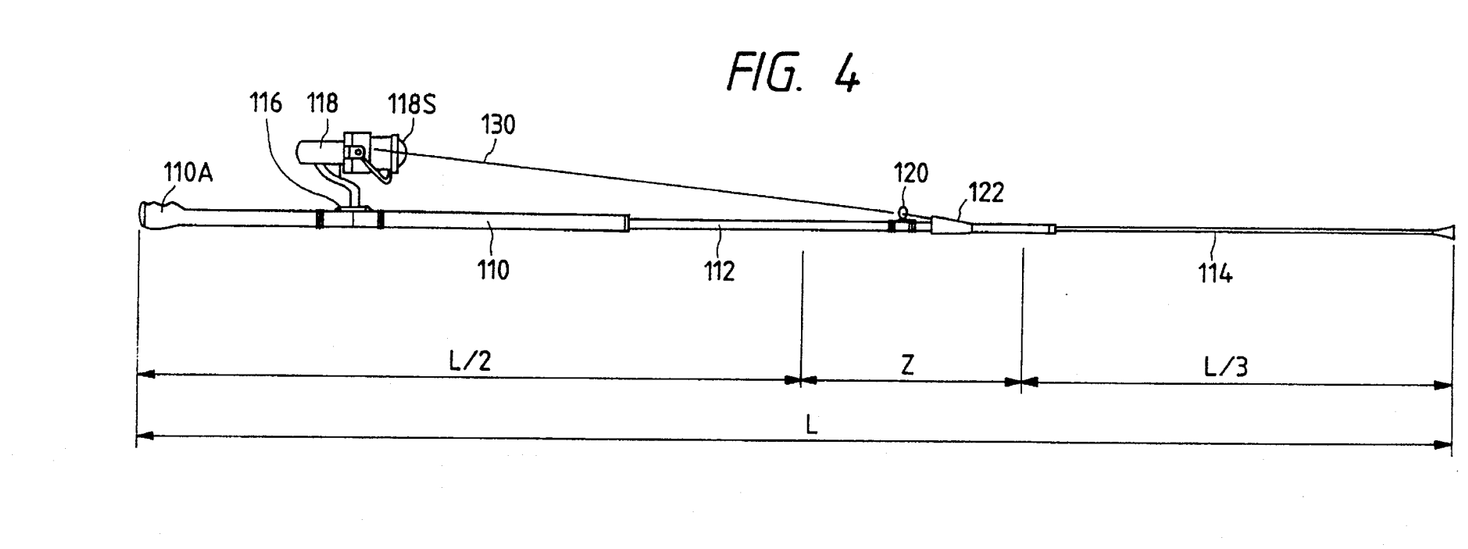
FIG. 4 is a side view showing an inter-line fishing rod according to yet another embodiment of the present invention.

FIG. 4 is a side view showing an inter-line fishing rod according to yet another embodiment of the present invention. The rod tube of this fishing rod includes a butt rod 110, a middle rod 112, and a tip rod 114. The number of joints of the rod tube is not limited to a specific number. A reel sheet 116 is mounted on the butt rod 110. A spinning reel 118 is mounted on the reel sheet 116. A hand grip 110A is formed at the bottom or base part of the rod tube.

A line guide 122 is fastened to the fore part of the middle rod 112. An auxiliary ring 120 is also fastened thereto on the rear side of the line guide 122. The entire length of the casting rod is denoted as L. The line guide 122 is located within a range Z between a point distanced forward about ½ of the entire rod length (a point distanced approximately (½)L from the rear or bottom end of the rod tube) and another point distanced rearward ⅓ of the entire rod length from the tip top thereof (another point distanced approximately (⅓)L from the top end of the rod tube). Within the range Z, the line guide 122 is located at a point near to a point where a fishing line 130 pulled out of the spinning reel 118 comes in contact with an arc of the fishing rod when it is whipped for casting.

Figure 5:
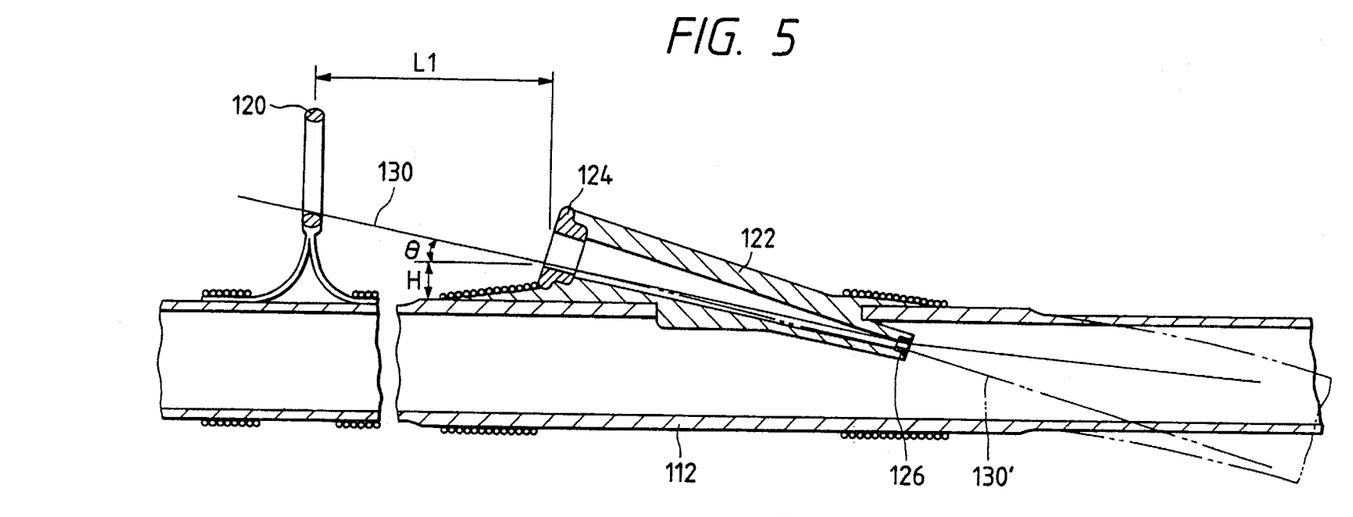
FIG. 5 is an enlarged longitudinal sectional view of a part of the inter-line fishing rod shown in FIG. 4.

Referring to FIG. 5, line guide rings 124 and 126 made of ceramics are firmly attached to both ends of the line guide 122, respectively. In the case of the fishing rod with the auxiliary ring 120 as of this embodiment, whether or not the fishing line 130 is brought into contact with the line guide ring 124 located at the rear end of the line guide 122 depends on the distance L1 between the line guide ring 124 and the auxiliary ring 120, the height H of the line guide ring 124 as measured from the surface of the rod tube, the height of the auxiliary ring 120, and the like. Generally, the fishing line 130 is brought into contact with the inner surface of the line guide ring 126, which is located at the fore end of the line guide 122. At this contact position, the fishing line 130 is changed in its direction.

To reduce resistance of the fishing line, which is caused by a change of the fishing line direction, it is desirable that an angle of the line guide 122 to the middle rod 112 is as small as possible. However, the angle of the line guide 122 is set at approximately 15° or smaller because of some restrictions. The restrictions follow. There is a limit in increasing the length of the line guide 122. If the height H of the line guide ring 124 is small, the fishing line 130 comes in contact with the surface of the middle rod 112, for example, thereby further increasing the fishing line resistance. To avoid this, a certain measure of the height H is required. It is for this reason that the angle is set at about 15° or smaller. In this embodiment, the angle is set at approximately 13°. An angle of the fishing line 130 is approximately 10° at a location where the fishing line 130 existing outside of the rod tube is introduced into the inside of the rod tube through the line guide 122.

As shown, when a normal state of the inter-line fishing rod where the line guide 122 is inclined at approximately 13° and the fishing line 130 is introduced at approximately 10° is shifted to a bending state of the fishing rod when it is whipped for casting (indicated by phantom lines in FIG. 5), the fishing line 130 is smoothly introduced into the rod tube through the line guide 122, with a little change of its direction with respect to the greatly bent rod tube, as indicated by a phantom line 130'. In the casting mode, from this state, the fishing line recovers from its bent state and takes a linear shape as indicated by a solid line. Since the position and the inclination angle of the line guide 122 are as described above, there is no chance that the fishing line is greatly turned from the middle rod 112 during the transient period of reshaping the bent rod into the linear rod. Therefore, the fishing line resistance is sufficiently reduced and a casting distance is increased.

The fishing line wound on a spool 118S of the spinning reel 118, when cast, is pulled forward therefrom while being spirally turned. If the fishing line is introduced into the rod tube while being spirally turned, it runs within the rod tube while fictionally contacting with the inner surface of the rod tube. Therefore, the fishing line resistance becomes large.

To reduce this fishing line resistance, the present invention reduces the spiral turning motion of the fishing line in three stages. In the first stage, to reduce the spiral turning motion, the inner diameter of the auxiliary ring 120 is smaller than that of the spool 118S. In the second stage, the inner diameter of the line guide ring 124, located at the rear end of the line guide 122, is reduced to be ½ or smaller than the inner diameter of the auxiliary ring 120. In the third stage, the inner diameter of the line guide ring 126 is reduced to be ½ or smaller than that of the line guide ring 124. After the fishing line undergoes three stages of reducing the spirally turning motion thereof, the spiral turning motion of the fishing line is reduced to be negligible. The fishing line thus processed for the spiral turn removal is then introduced into the middle rod 112. In this embodiment, the inner diameters of the auxiliary ring 120, the line guide ring 124, and the line guide ring 126 are selected at approximately 9:3:1. The distance L1 between the line guide ring and the auxiliary ring is approximately 100 to 300 mm.

The fishing line leaving the spool 118S has a great spirally-turning motion. In an attempt to gain a linear fishing line by rapidly reducing such a large spiral turn of the fishing line at only one point or stage, the fishing line greatly changes in its direction at that stage, so that the fishing line resistance is increased, and the running speed of the fishing line is reduced. To avoid this problem, in this embodiment, three separate stages for removing the spiral tuning motion of the fishing line are arrayed along the path of the fishing line. The inner diameters of those rings should be gradually reduced at the ratio of at least 4:2:1.

As seen from the foregoing description, the inter-line fishing rod of the present invention is constructed such that in a region where the fishing rod is greatly bent for casting, a fishing line runs within the rod tube so as to follow the bending of the rod, while in another region where the fishing rod is little bent, the fishing line runs outside the rod tube so as to reduce resistance of the fishing line. With this unique construction, the casting direction of the fishing line is controlled exactly, and the casting distance is increased.

Further, in the inter-line fishing rod of the present invention, the fishing line runs at an angle of about 15° with respect to the middle rod, within the line guide. The line guide is located near to a point where the fishing line pulled out of the reel comes in contact with an arc of the fishing rod when it is whipped for casting. Therefore, when cast, the fishing line runs within the rod tube in a state that it does not undergoes a great bending (change of its direction). Accordingly, the fishing line resistance is reduced and the casting distance is increased.

Still another embodiment of the present invention will be described with reference to FIGS. 6 to 8.

Figure 6:
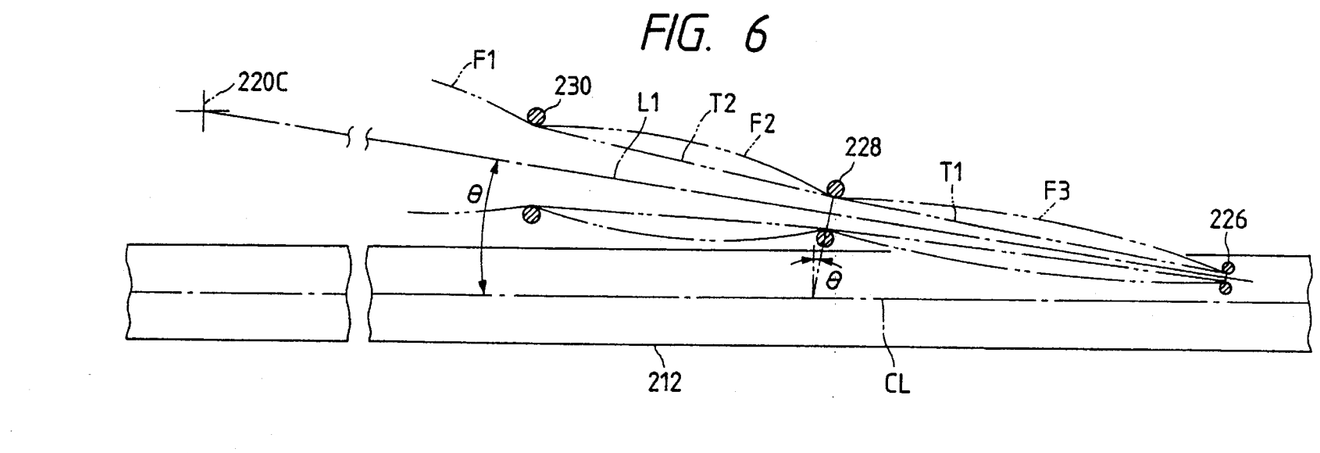
FIG. 6 is an explanatory diagram showing the principle of the present invention.

FIG. 6 is an explanatory diagram showing the principle of the present invention. As shown, first to third guide rings 226 to 230 are spatially arrayed on a line L1 drawn from a spool center 220c of a reel to the center of the first guide ring 226, which is inclined at an angle θ to the axial line CL of the rod tube 212. The angle θ is approximately 15° or smaller (preferably 2° to 10°). In the array of these guide rings, the first guide ring 226 is located on the right side (as viewed in the drawing), the third guide ring 230 is located on the left side, and the second guide ring 228 is located between the first and third guide rings 226 and 228. The first guide ring 226 is disposed within the rod tube 212, and the second and third guide rings 228 and 230 are disposed outside the rod tube 212. These guide rings are preferably made of hard material of high wear-proof, usually ceramics, and worked to have a smooth inner surface. The guide rings may also be made of metal or ceramics and coated with a hard film.

The inner diameters D1, D2, and D3 of the first, second, and third guide rings 226, 228, and 230 are related as follows:

D1<D2<D3

Further, it is preferable that the following relations hold

D1≦(⅓)·D0

(½)·D0≦D2≦(⅔)·D0

D0≦D3 where D0 is the inner diameter of the rod tube 212.

The inner diameters of the first to third guide rings are gradually reduced toward the tip of the rod tube. With this arrangement of the guide rings, the spirally turning motion and the vibrating motion of the fishing line (these motions generated denoted as F1 in the figure), which is pulled out of the spool for casting, are gradually attenuated as indicated by F2 and F3. When leaving the first guide ring 226 within the rod tube 212, the fishing line is substantially linear in shape. When the linear fishing line runs within the rod tube, it is hardly brought into contact with the inner surface of the rod tube. Accordingly, resistance of the fishing line is reduced, and a casting distance is increased.

The second and third guide rings 228 and 230 are disposed such that the line L1 passes through these rings (preferably along the center of the rings). Accordingly, a variation of the fishing line direction is substantially eliminated in the range from the spool to the first guide ring 226. The result is to reduce the fishing line resistance when the fishing line is cast and wound up.

The center of the first guide ring 226 is higher than the axis CL of the rod tube 212 in FIG. 6. The top of the inner circumference of the first guide ring 226 (FIG. 6) is greatly spaced, at least the inner diameter D1 of the first guide ring 226, from the top of the inner circumference of the middle rod 212. The bottom of the inner circumference of the second guide ring 228 (FIG. 6) is higher than the outer circumference of the rod tube 212, at least about ½ of the inner diameter D2 of the second guide ring 228. The bottom of the inner circumference of the third guide ring 230 is further higher than the outer circumference of the rod tube 212. Accordingly, presence of the third guide ring 230 is frequently obstructive in carrying the fishing rod. To avoid this, it is preferable to employ a well-known folding mechanism for the third guide ring 230.

The second guide ring 228, which receives the fishing line sufficiently attenuated in the spirally turning/vibrating motion, is fastened to the rod tube at an angle θ to the direction perpendicular to the axis CL so that the fishing line is inserted into the second guide ring 228 at a right angle. Preferably, the first guide ring 226 is also inclined in a similar way.

With this structure, it is easy to insert the fishing line into the guide rings, and the fishing line is prevented from being in contact with the surface of the rod tube. Thus, the fishing line resistance is reduced.

A part of the rod tube 212 located between the first guide ring 226 and the second guide ring 228 is cut out. If the cutout is large as shown in FIG. 6, the fishing line is effectively prevented from contacting with the rod tube surface. This is further ensured since the respective guide rings are spaced above the rod tube surface as mentioned above. If required, other guide rings may be provided in addition to the second guide ring, between the first and third guide rings. In this case, the fishing line resistance must be reduced by gradually killing the spiral turn and vibration of the fishing line. To this end, it should be avoided that these additional guide rings are located within a first conic T1 connecting the inner circumferences of the first and second guide rings 226 and 228 and another second conic T2 connecting the inner circumferences of the second and third guide rings 228 and 230. An additional guide ring may be provided behind the third guide ring 230.

The first and second conics T1 and T2 connecting the inner circumferences of the guide rings may be realized in the form of tubular guides made of hard material, such as ceramics. The tubular guides contiguously coupled may be used in place of these separate guide rings 226, 228, and 230 within the spirit of the present invention. Only the first conic T1 may be realized in the form of a tubular guide made of hard material. Alternatively, an additional tubular guide of the gradually increasing diameter may be contiguously coupled with one end of the tubular guide T2, the other end of which is also continuously coupled with the tubular guide T1.

The "spool center 220c" of the reel thus far frequently used indicates the center of the coiled fishing line on the axis of the spool in the spinning reel or a closed face reel of those standard reels attached to the fishing rod. In the case of a double-bearing reel or a single-bearing reel, the spool center indicates the height of the outer circumference of the spool. In the case of a reel with a level wind device, it indicates the insertion center of the fishing line when it is inserted into the level wind device. The inner circumference of each guide ring is not limited to be circular in shape, but may take an elliptical or any other suitable shape.

Figure 7:
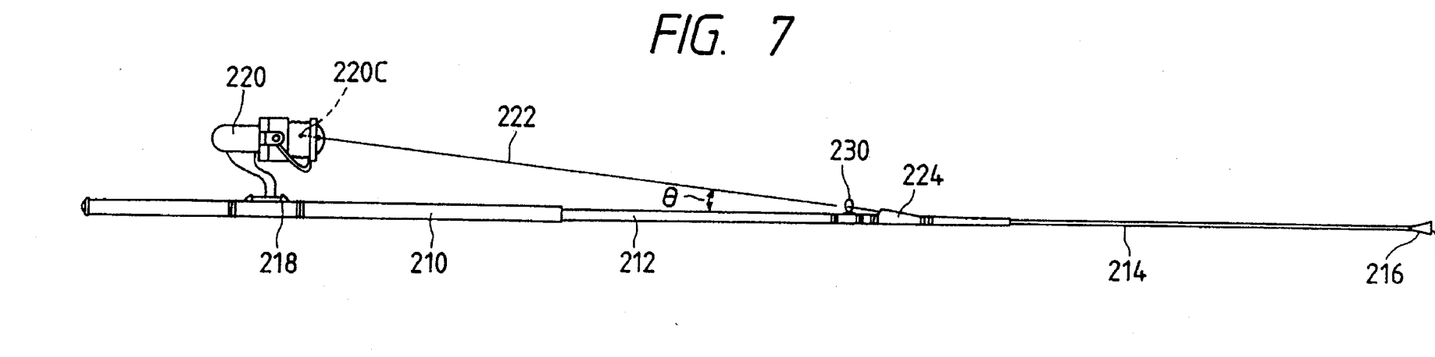
FIG. 7 is a side view showing the inter-line fishing rod according to still another embodiment of the present invention employing the principle explained along FIG. 6.
Figure 8:
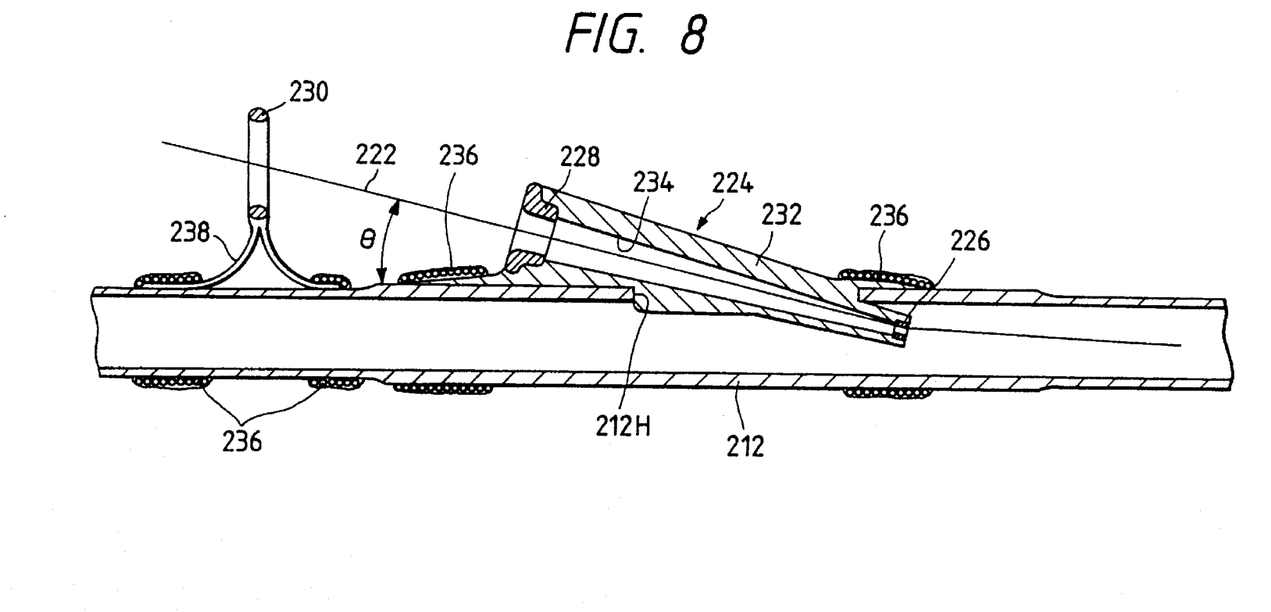
FIG. 8 is an enlarged longitudinal sectional view of a part of the inter-line fishing rod shown in FIG. 7.

FIGS. 7 and 8 cooperate to show a fishing rod constructed on the basis of the principle of the present invention thus far described referring to FIG. 6. A reel sheet 218 is mounted on a butt rod 210. A spinning reel 220 is mounted on the reel sheet 218. The butt rod 210 is coupled at the top end with the rod tube 212. The rod tube 212 is further coupled at the top end with a tip rod 214. A hole 212H is formed in the rod tube 212. A line guide 224 is set in the hole 212H. The third guide ring 230 is located on the left side of the line guide 224 in FIG. 8. A fishing line 222 pulled out of the spinning reel 220 passes through the third guide ring 230, the line guide 224, the rod tube 212, and the tip rod 214, and is led out from a top guide 216, which is provided at the tip top of the fishing rod.

The first and second guide rings 226 and 228 are mounted at both ends of a frame 232 with a through hole 234, fastened to the middle rod 212 by means of coiled wires 236. The through hole 234 is more outwardly expanded than a phantom conical tube connecting the inner circumferences of the guide rings 226 and 228. The third guide ring 230 is mounted, in an upstanding fashion, on the middle rod 212 by means of a support member 238 made of metal. The support member 238 is fastened to the middle rod 212 by coiled wires 236. If required, the third guide ring 230 may be mounted in a similar fashion on a part of the frame 232, which is extended to the left in the drawing.

The present embodiment is arranged such that the fishing line 222 pulled out of the spool of the spinning reel 220 passes through the center of each ring guide. With this arrangement, when wound up, the fishing line 222 comes in contact with only the first guide ring 226. Because of this, its resistance is small. When cast, the fishing line 222 is pulled out while spirally turning, and experiences a first action for reducing the spirally turning motion thereof when it passes through the third guide ring 230. In this case, when passing through the third guide ring 230, the spirally turning line uniformly contacts with the inner surface of the third guide ring 230. Accordingly, the fishing line resistance is small.

There is not any member, which restrains the spirally turning motion of the fishing line between the third guide ring 230 and the second guide ring 228. Accordingly, the spirally turning motion of the advancing fishing line is slightly expanded again in the radial direction, as indicated by a two-dot chain line F2 in FIG. 6. Then, the fishing line enters the second guide ring 228 where it undergoes a second action for reducing the spirally turning motion. At this time, the resistance of the fishing line is small as when, it passes through the third guide ring 230. Thereafter, the fishing line enters the through hole 234 of the frame 232. When running through the through hole, the inner wall of the through hole restrains a radial expansion of the spirally turning motion of the fishing line. Then, the fishing line enters the first guide ring 226 where it experiences a third or final action for reducing the spirally turning motion. The fishing line thus substantially linearized runs within the middle rod 212 toward the tip top of the fishing rod. During the running of the fishing line, the fishing line does not contact with the inner surfaces of the rod tubes 212 and 214. Accordingly, no increase of the fishing line resistance is created.

The second guide ring 228 and the first guide ring 226 are inclined with respect to the axis of the middle rod 212 so that the planes of these rings are perpendicular to the extending direction of the incoming fishing line. This arrangement of the guide rings makes it difficult for the fishing line 222 to come in contact with the surface of the middle rod 212 and the end of the frame 232. Incidentally, the irregular surfaces of the coiled wires 236 are filled with resin for fixing the coiled wires to be smooth. If the fishing line accidentally comes in contact with the surface of the coiled wires, the fishing line will slide on the surfaces of the coiled wires at a small sliding resistance.

As seen from the foregoing description, the first guide ring located inside the rod tube, and the second and third guide rings located outside the rod tube are gradually enlarged in their diameter, and the height and positions of the first to third guide rings are properly selected, whereby a fishing line pulled out of the reel runs within those guide rings in a linear state. With this arrangement, the fishing line is wound up in a linear state while coming in contact with only the first guide ring when it is wound up. Accordingly, the fishing line undergoes a less frictional resistance when it is wound up. When cast, the spiral tuning/vibrating motion of the fishing line is gradually attenuated. Within the rod tube, the fishing line runs in a state that it hardly comes in contact with the inner surface of the rod tube. Therefore, the fishing line resistance is reduced and the casting distance is elongated. Additionally, when the fishing rod is operated, the fishing line will never be cut.

What is claimed is:

1. An inter-line fishing rod in which a fishline is at least partially passed through the inside thereof, said rod comprising an improvement wherein a line introducing hole for introducing the fishline into the inside of the rod is located within a range between a point distanced forward about ½ of the entire rod length L from the bottom end of the rod and another point distanced rearward about ⅓ of the entire rod length from the tip top of the rod, wherein the location of the line introducing hole is varied within the range depending on the bending characteristic of the inter-line fishing rod.

2. An inter-line fishing rod as recited in claim 1, said fishing rod further comprising:

a butt rod portion; and a second rod portion; said second rod portion telescopingly engaging said butt rod portion to translate from a collapsed position to an extended position, wherein said line introducing hole is located on said second rod portion adjacent to an end of said second rod portion positioned furthest from said butt rod portion when said second rod portion is in said extended position.

3. A series of inter-line fishing rods characterized in that each line introducing hole formed in each rod of said series is located within a range between a point distanced forward about ⅓ of the entire length L of a corresponding from the bottom end thereof and another point distanced rearward about ⅓ of the entire length L from the tip top so that the locations where the line introducing holes of the rods of a relatively flexible type are formed are respectively closer to the butts of the fishing rods than those of the line introducing holes of the fishing rods of a relatively rigid type.

4. A method of determining locations of line introducing holes for inter-line fishing rods to be manufactured as a series, characterized in that each line introducing hole is located within a range between a point distanced forward about ⅓ of the entire length L of a corresponding from the bottom end thereof and another point distanced rearward about ⅓ of the entire length L from the tip top so that the locations where the line introducing holes of the rods of a relatively flexible type are formed are respectively closer to the butts of the fishing rods than those of the line introducing holes of the fishing rods of a relatively rigid type.

5. An inter-line fishing rod, comprising:

a rod tube;

a line guide for guiding a fishing line from the outside of said rod tube to the inside thereof, said line guide being located within a range between a point distanced forward about ½ of the entire rod length from the bottom end of the rod tube and another point distanced rearward ⅓ of the entire rod length from the tip top of the rod tube; and a line guide ring for changing the direction of the fishing line so that an angle of the fishing line when it is introduced into the rod tube through the line guide is 15° or smaller with respect to a longitudinal axis of the rod pipe.

6. The inter-line fishing rod according to claim 5, wherein said line guide is located at a point near to a point where the rod pipe is greatly bent when it is whipped for casting so that the fishing line guided by said line guide extends substantially in a tangential direction with respect to the rod pipe bent into an arcuate shape.

7. An inter-line fishing rod in which a fishing line is introduced from the outside of a rod tube into the inside thereof, said rod comprising:

a first guide ring made of wear-proof material and provided within the rod tube; and second and third guide rings made of wear-proof material, arranged in this order rearwardly from the first guide ring and provided outside the rod tube; and wherein:

a line connecting the center of the first guide ring to the spool center of the reel passes through the second and third guide rings;

only the fishing line lies in a first conic defined by the inner circumferences of the first and second guide rings and a second conic defined by the inner circumferences of the second and third guide rings; and the inner diameters of the first, second, and third guide rings become larger in this order.

8. The inter-line fishing rod according to claim 7, wherein the first and second guide rings are supported by a tubular frame, and an inner circumference of the tubular frame is located radially outside the first conic defined by the inner circumferences of the first and second guide rings.

9. An inter-line fishing rod in which a fishline is at least partially passed through the inside thereof, said rod comprising:

a butt section having a reel mounting member for mounting a fishing reel;

a tip section through which the fishline passes and having an exit aperture through which the fishline exits to extend away from said rod; and a middle section removably affixed between said butt section and said tip section along a longitudinal axis, said middle section including a line introducing hole for introducing the fishline into the inside of the rod, said line introducing hole being remotely located with respect to said butt section;

wherein the location of the line introducing hole is varied within the range depending on the bending characteristic of the inter-line fishing rod.

* * * * *